(12) United States Patent
Van De Mortel

(10) Patent No.: US 6,474,377 B1
(45) Date of Patent: Nov. 5, 2002

(54) SELF-PROPELLED CLIMBING TREE TRIMMER

(76) Inventor: Mike Van De Mortel, 5110 Webb Pl., Yorba Linda, CA (US) 92886

( * ) Notice: Subject to any disclaimer, the term of this patent is extended or adjusted under 35 U.S.C. 154(b) by 0 days.

(21) Appl. No.: 10/068,130

(22) Filed: Feb. 8, 2002

(51) Int. Cl.$^7$ .............................................. A01G 23/02
(52) U.S. Cl. ............................... 144/24.13; 47/1.01 R; 144/208.2; 144/343
(58) Field of Search .................... 47/1.01 R; 144/24.13, 144/208.2, 343

(56) References Cited

U.S. PATENT DOCUMENTS

| | | | | |
|---|---|---|---|---|
| 2,477,922 A | * | 8/1949 | Emery et al. | 144/24.13 |
| 2,482,392 A | * | 10/1949 | Whitaker | 144/24.13 |
| 3,457,973 A | * | 7/1969 | Meier | 144/24.13 |
| 3,545,509 A | * | 12/1970 | Baxter, Jr. | 144/24.13 |
| 4,279,281 A | * | 7/1981 | Nakamura | 144/24.13 |

* cited by examiner

*Primary Examiner*—W. Donald Bray
(74) *Attorney, Agent, or Firm*—Albert O. Cota

(57) ABSTRACT

A self-propelled, climbing tree trimmer for severing branches from a tree (68) consisting of a support ring (12) divided into two equal parts, with a hinge (18) connecting the ring parts together, thus permitting it to be axially rotated apart to surround a tree. A channel ring (30) in two equal halves are joined onto the support ring, and a similar two piece rotatable ring gear (40) is juxtaposed on top of the channel ring in a revolvable manner. A number of pivoting knife blades (46) are attached to the ring gear so as to tilt inward when rotated, and a ring gear drive motor (62) interfaces with the ring gear rotating the ring gear at a speed which tilts the blades sufficiently to engage and cut fronds or branches from the tree upon which the trimmer surrounds. A plurality of traction arms (66) are attached to the support ring for angularly positioning the arms adjacent to a tree, and a toothed traction wheel (74) attached at the distal end of the traction arms are employed for propelling the trimmer up and down the tree (68). The channel ring and the ring gear are synchronized to align with each other when stopped, thereby permitting the trimmer to open and close around a tree.

17 Claims, 8 Drawing Sheets

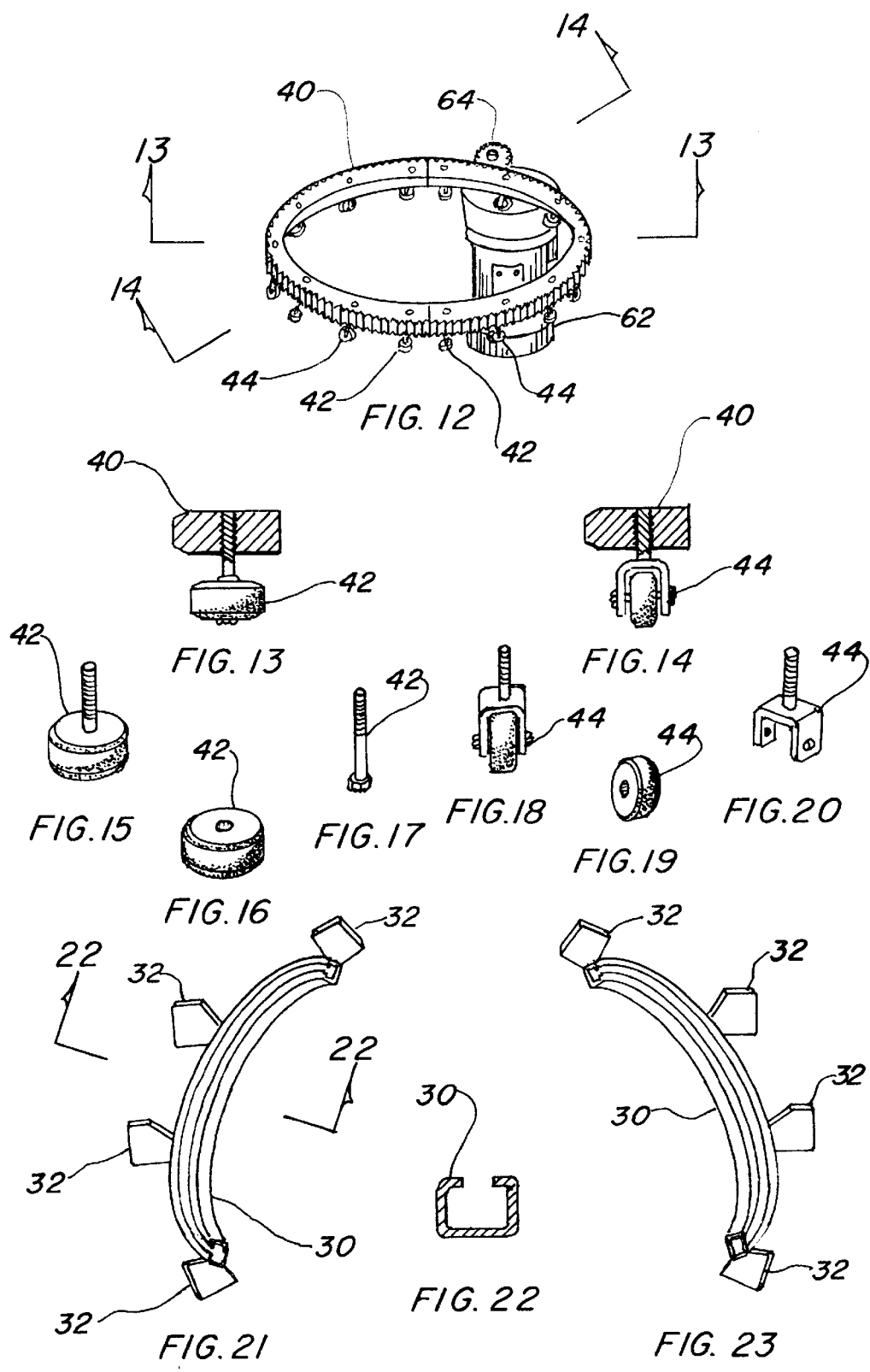

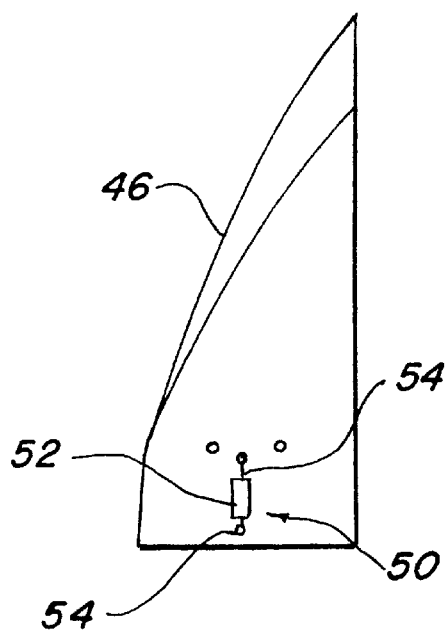
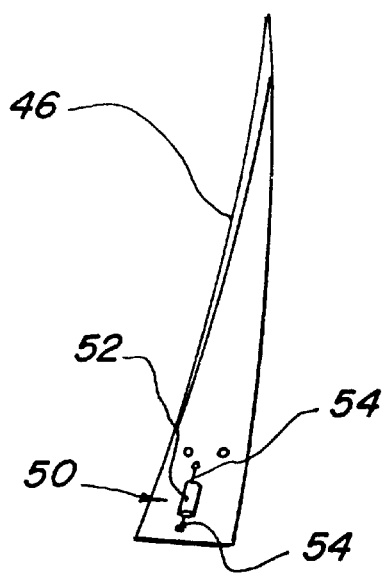
FIG. 27
FIG. 28
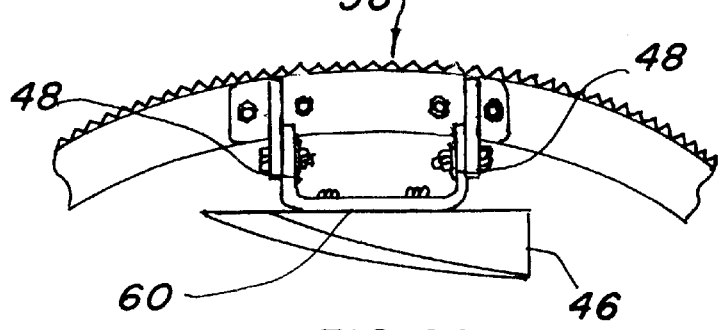
FIG. 29
FIG. 30
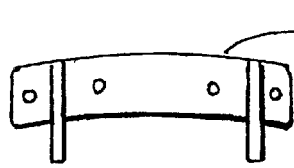
FIG. 31
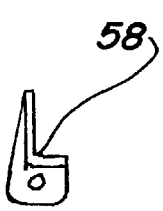
FIG. 32
FIG. 33
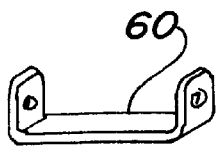
FIG. 34
FIG. 35

SELF-PROPELLED CLIMBING TREE TRIMMER

TECHNICAL FIELD

The present invention relates to tree trimmers in general. More specifically to an apparatus that is self-propelled and climbs trees while cutting fronds or branches with revolving blades.

BACKGROUND ART

Previously, many types of mechanical devices have been used for providing a means to climb and remove limbs of standing trees.

A search of the prior art did not disclose any patents that possess the novelty of the instant invention, however the following U.S. patents are considered related:

| Pat. No.  | Inventor       | Issue Date    |
|-----------|----------------|---------------|
| 5,983,966 | Clouston       | Nov. 16, 1999 |
| 5.975,168 | Ericksson      | Nov. 2, 1999  |
| 5,524,685 | Barnhill et al.| Jun. 11, 1996 |
| 4,690,184 | Fuminao        | Sep. 1, 1987  |
| 4,527,603 | Hori           | Jul. 9, 1085  |
| 3,545,509 | Baxter Jr.     | Dec. 8, 1970  |

Clouston in U.S. Pat. No. 5,983,966 teaches a self-propelled tree pruning apparatus using a cutting tool with helical edges. The invention includes a frame, a pair of driven wheels and a pair of hugger wheels that are rotatably attached to the frame. Pneumatic air bags urge the hugger wheels toward the driven wheels, and the cutting tool is attached to a drive shaft which is also attached to the frame and is movable along three axes. A self-powered engine drives both the cutting tool and the driven wheels. The drive engine is throttled back to an idling speed and the pressure is released on the air bag when the device is to descend to the ground.

U.S. Pat. No. 5.975,168 issued to Ericksson is for a trimming device that utilizes a harvester head positioned at a pre-selected transverse position relative to a tree trunk. A control device is movably connected to a tree trimming member selecting a transverse position relative to the tree trunk. An actuator urges a tree trunk engaging portion into engagement with the tree and the trimming member at the pre-selected transverse position.

Barnhill, et al. in U.S. Pat. No. 5,524,685 discloses a debarking/declimbing apparatus having a rotatably driven spool device that removes bark as the tree parts are moved lengthwise across its axis. The spool device consists of a rotor which includes tooth elements with two spools used in concert. The debarking elements may be fixed in helical form or may be flexibly mounted and capable of assuming a near helical form.

Fuminao in U.S. Pat. No. 4,690,184 teaches a tree pruning machine having a cutting unit mounted on a frame and wheels elevating vertically. A first member has drive wheels mounted on its lower portion that are driven by an engine; a chain saw is also rotated by the engine. A branch sensing member projects forward temporarily stopping the drive toward the upward direction of a standing tree.

U.S. Pat. No. 4,527,603 issued to Hori is for an automatic lopping machine which has a body with a drive unit, a chain saw and a number of drive wheels. An auxiliary unit includes idle wheels connected together with the main body so as to encircle a tree trunk. The drive unit is used to drive the chain saw and the drive wheels when the machine revolves helically around the tree trunk when the machine ascends a tree trunk.

Baxter Jr. in U.S. Pat. No. 3,545,509 discloses a tree harvester that converts standing trees into chips by delimbing the tree from the bottom to the top, debarking the trunk from the top to the bottom, and progressively converting the tree trunk into chips from the top down. The device uses chain saws with knives that produce chips with long fibers and direct the chips upwardly out of the path of the knives.

DISCLOSURE OF THE INVENTION

Many attempts have been made to trim trees remotely without the necessity of actually climbing the tree. This utility is particularly useful when removing fronds from palm trees, as it has always been very difficult to trim palms or cycads since the fronds have sharp needle like barbs on their ends that are connected to husks. Additionally, considerable dust, dirt, trash and even rodents such as tree rats live in the tops of these type of tree. The common procedure for trimming and/or dressing palm trees is to manually cutoff and remove the frond adjacent to the palm husk. This operation requires a mechanical hoist or some other method of lifting the trimmer to the area that is to be trimmed. In some cases, the trimming is manually accomplished by actually climbing the tree using climbing gear that is well known in the art. Regardless of how the work is accomplished, it is dangerous and liability increases the cost. Also, the work is labor intensive and the initial cost of elaborate lifting equipment is fairly high. Therefore the primary object of the invention is to utilize a mechanical, self-propelled trimmer that climbs the tree and trims the fronds using a revolving set of blades, which allows an operator to remain on the ground a safe distance away and remotely guide the trimmer in its climbing speed and its depth of cut.

An important object of the invention is directed to its safety aspect since the operator is completely removed from the area where the fronds fall, the operator is not precariously positioned during any phase of the trimming operation.

Another object of the invention is that the most current automation is employed, using motors that are many times smaller and more powerful than prior art equipment and are compact and deliver energy density exceeding internal combustion engines.

Still another object of the invention is the speed that a tree can be trimmed relative to the manual process. The operator simply attaches the inventive self-propelled climbing tree trimmer around the base of the tree and connects the trimmer to a utility power source or to a portable generator and stands clear while controlling the movement of the trimmer and depth of cut from a safe remote location on the ground. It is easily understood that the time to trim the tree is reduced to a fraction of the manual process.

Yet another object of the invention is the flexibility of the trimmer. Although the timmer is primarily designed to be used with palm trees or cyaids it may also be used on other trees that have small branches which are typically trimmed while the tree is still growing.

A further object of the invention is the ability of the trimmer to leave a palm tree with a uniform appearance as the uneven husks left on the tree after trimming in a conventional manner are completely eliminated, thus causing all adjacent trees to have the same uniform outward appearance. The invention is able to deliver a uniform, visual outside shape of the tree trunk with reliable repetition.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 6 is a partial isometric view showing both halves of an aligning means completely removed from the invention for clarity.

FIG. 12 is a partial isometric view of a ring gear and variable speed ring gear drive motor as an assembly, completely removed from the invention for clarity.

FIG. 13 is a cross-sectional view taken along lines 13—13 of FIG. 12 illustrating a single horizontal roller.

FIG. 14 is a cross-sectional view taken along lines 14—14 of FIG. 12 illustrating a single vertical roller.

FIG. 15 is a partial isometric view of a horizontal roller assembly, removed from the ring gear.

FIG. 16 is a partial isometric view of an individual horizontal roller wheel, removed from the ring gear assembly.

FIG. 17 is a partial isometric view of a shaft of the horizontal roller, removed from the assembly for clarity.

FIG. 18 is a partial isometric view of a vertical roller assembly, completely removed from the ring gear for clarity.

FIG. 19 is a partial isometric view of an individual vertical roller wheel removed from the assembly for clarity.

FIG. 20 is a partial isometric view of a bifurcated bracket of the vertical roller, removed from the assembly for clarity.

FIG. 21 is a partial isometric view of the left half of the channel ring assembly with gussets attached, shown separately from the invention for clarity.

FIG. 22 is a cross-sectional view taken along lines 22—22 of FIG. 21 illustrating a representative configuration of the channel ring.

FIG. 23 is a partial isometric view of the right half of the channel ring assembly with gussets attached, shown separately from the invention for clarity.

FIG. 27 is a side elevational view of one of the pivoting knife blades including the adjustable counter balance, shown separately from the invention for clarity.

FIG. 28 is a end view of one of the pivoting knife blades including an adjustable counter balance, shown separately from the invention for clarity.

FIG. 29 is a plan view of one of the pivoting knife blades attached to the blade bracket assembly and to a short section of the ring gear, shown removed for illustrative purposes.

FIG. 30 is a left end view of one of the gear members of the blade bracket assembly, shown separately from the invention for clarity.

FIG. 31 is a plan view of one of the gear members of the blade bracket assembly, shown separately from the invention for clarity.

FIG. 32 is a right end view of one of the gear members of the blade bracket assembly, shown separately from the invention for clarity.

FIG. 33 is a left end view of one of the blade members of the blade bracket assembly, shown separately from the invention for clarity.

FIG. 34 is a plan view of one of the blade members of the blade bracket assembly, shown separately from the invention for clarity.

FIG. 35 is a right end view of one of the blade members of the blade bracket assembly, shown separately from the invention for clarity.

BEST MODE FOR CARRYING OUT THE INVENTION

Figure 1:
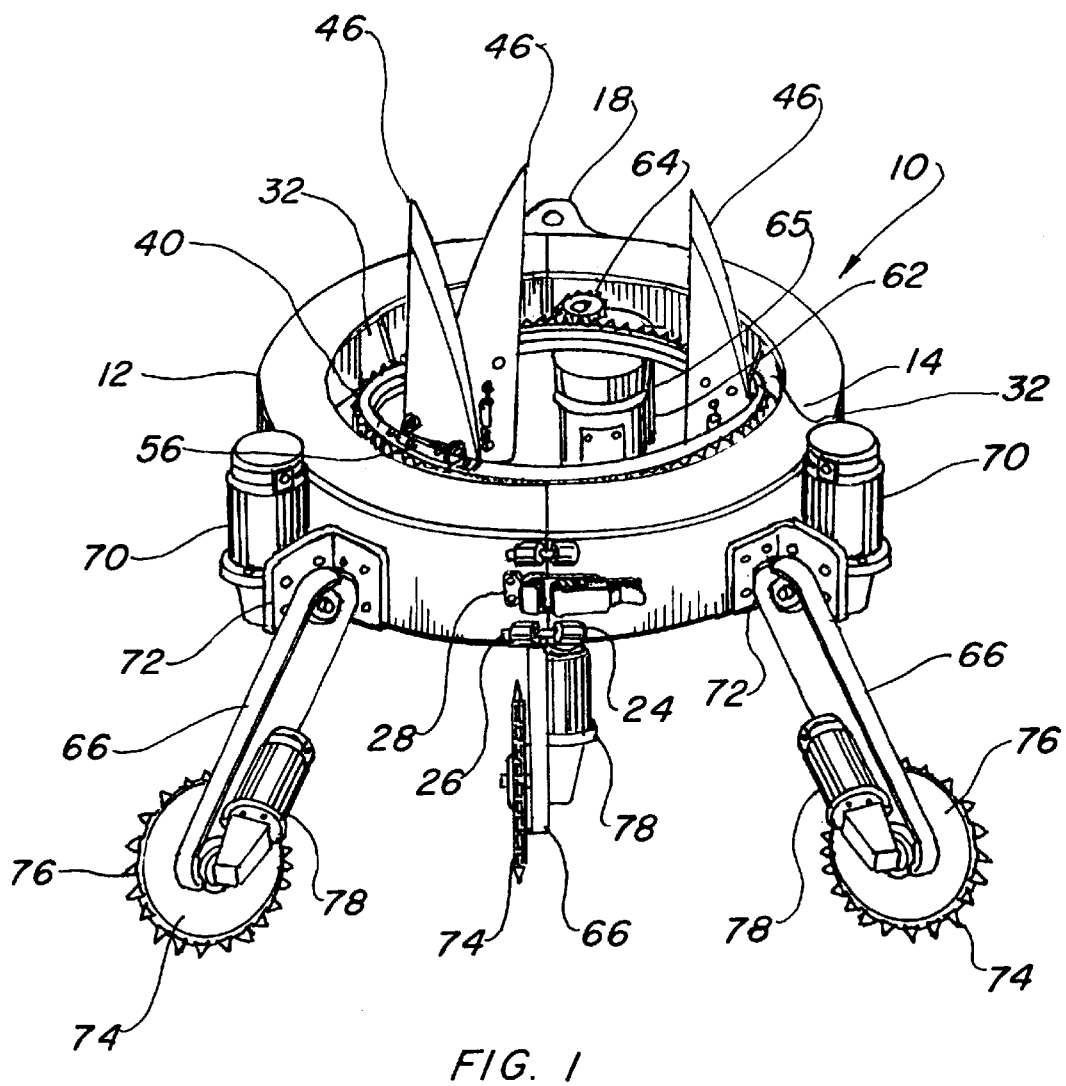
FIG. 1 is a partial isometric view of the preferred embodiment.
Figure 5:
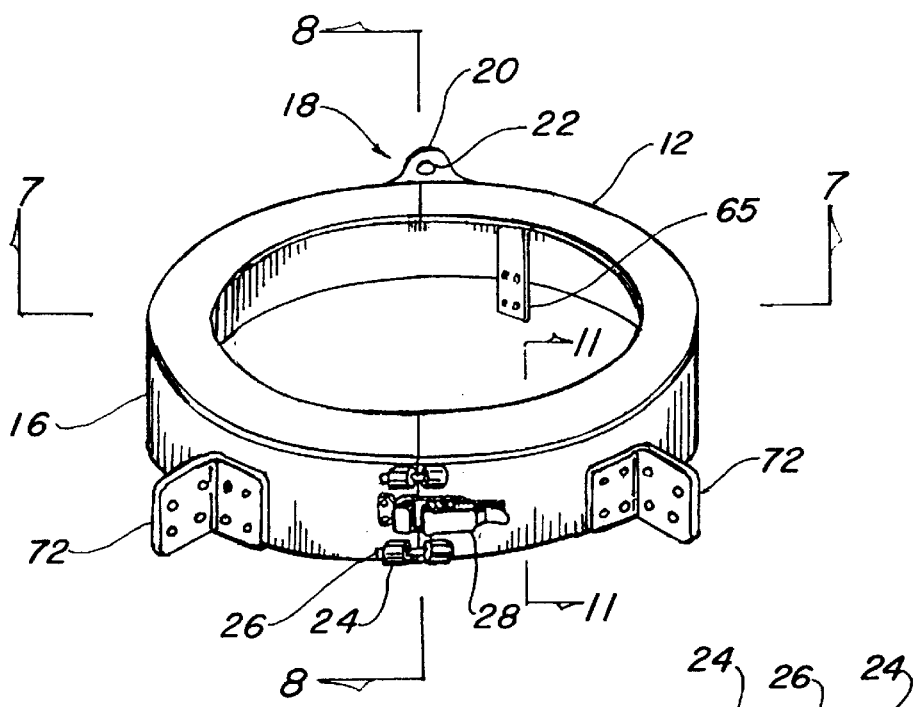
FIG. 5 is a partial isometric view of a hinged, split support ring as installed in the preferred embodiment.
Figure 7:
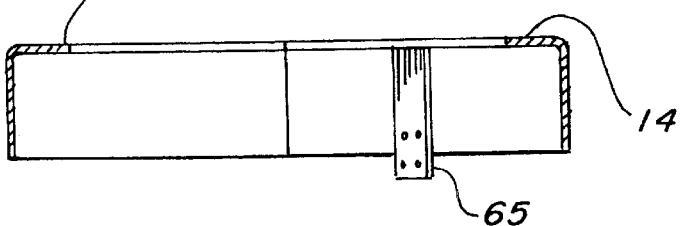
FIG. 7 is a cross-sectional view taken along lines 7—7 of FIG. 5.
Figure 8:
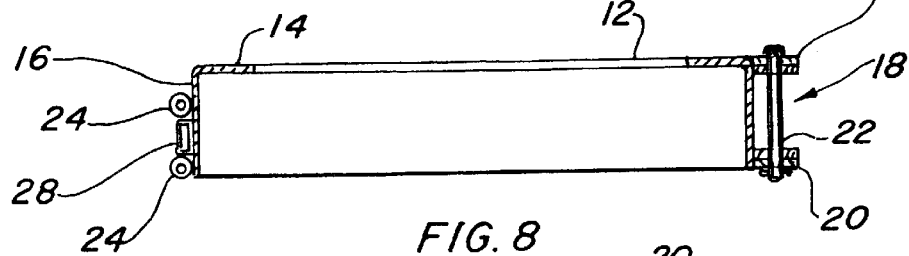
FIG. 8 is a cross-sectional view taken along lines 8—8 of FIG. 5.
Figure 11:
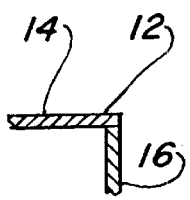
FIG. 11 is a sectional view taken along lines 11—11 of FIG. 5 illustrating an alternate method of constructing a support ring using two separate pieces welded together.

The best mode for carrying out the invention is presented in terms of a preferred embodiment, as shown in FIGS. 1 thorough 41, for a self-propelled, climbing tree trimmer 10 that is used for severing fronds or branches from a growing tree 68. While the basic utility is for use with palm trees, other trees with relatively small branches may be trimmed using this apparatus. The trimmer 10 consists of a hinged, split support ring 12 that is made up of a horizontal top portion 14 and a vertical peripheral wall 16. The horizontal top portion 14 and vertical peripheral wall 16 may be formed in one piece, as shown in FIGS. 5, 7 and 8, or in two separate pieces, as illustrated in FIG. 11, with both methods of construction working equally well.

Figure 3:
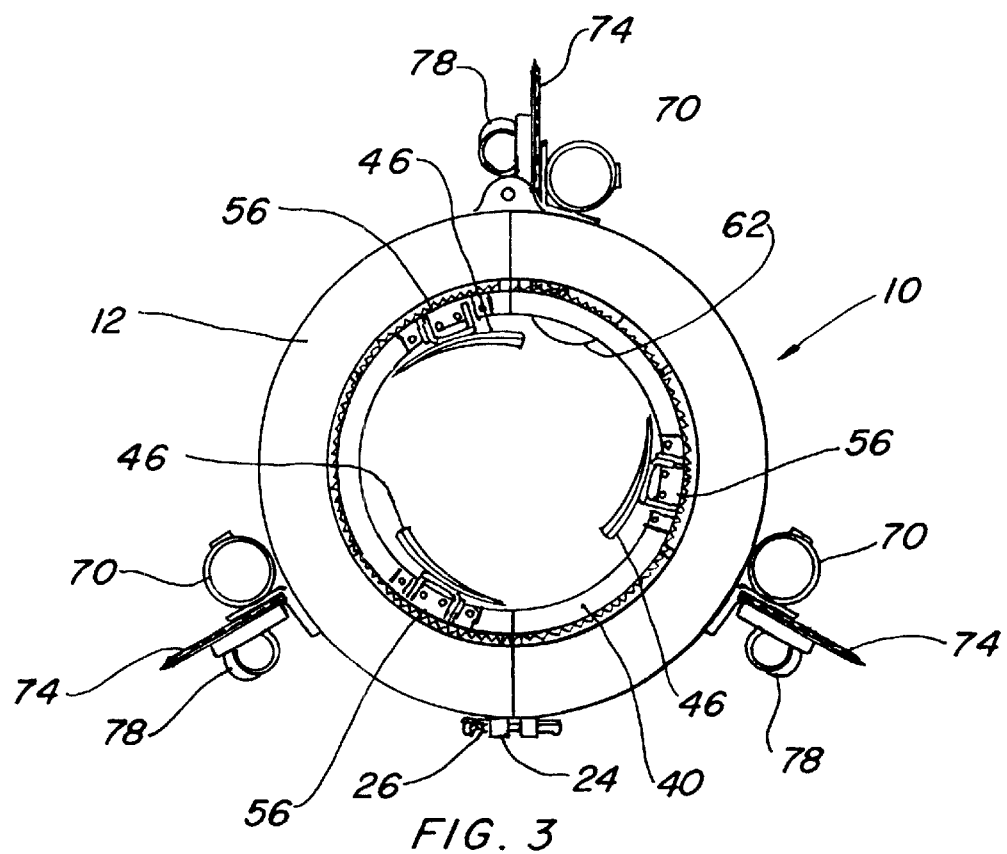
FIG. 3 is a plan view of the preferred embodiment in the closed position.
Figure 4:
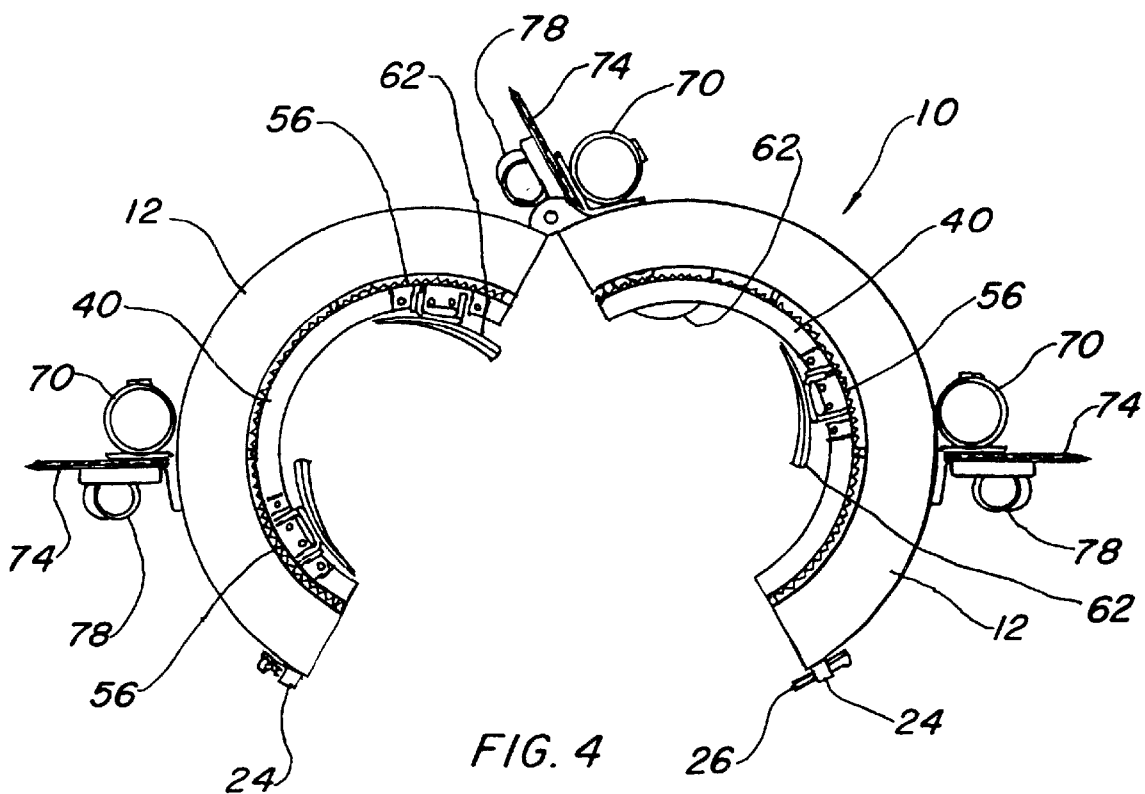
FIG. 4 is a plan view of the preferred embodiment shown in an open position ready for installation around a tree trunk.
Figure 36:
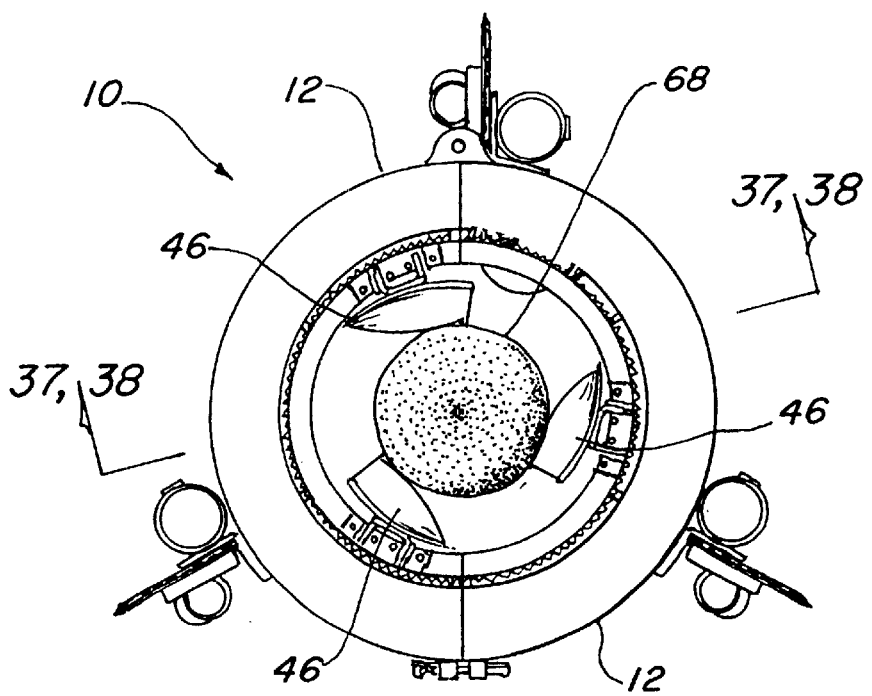
FIG. 36 is a plan view of the preferred embodiment in the closed position surrounding a tree trunk, shown with the blades in the extended, inward position during rotation.

The support ring 12 is divided into two equal parts as depicted in FIGS. 1, 3, 4, 5, 7, 8, 24 and 36 with a hinge 18 connecting the ring parts together permitting the support ring 12 to be axially rotated apart to surround a tree as shown in FIGS. 3, 4, and 36. The hinge 18 is disposed on the peripheral wall 16 permitting the support ring 12 to open sufficiently wide to be positioned around a tree trunk as illustrated. The hinge 18 consists of a plurality of contiguous hinge brackets 20 and a hinge pin 22 connecting the brackets together. Sleeve bearings, or the like, may be used to assure easy opening if desired. Obviously other types of hinges may be used such as a piano hinge or common leaf hinge.

Aligning means in the form of a plurality of aligning sleeves 24 and aligning pins 26 are attached to the vertical peripheral wall of the support ring such that when the trimmer 10 is closed each half of the support ring 12 are positively aligned and sustained. FIGS. 1, 3–5, 24 and 36 illustrate the preferred aligning means shown in place and FIG. 6 shows the parts separated from the trimmer. While this type of alignment mechanism is presented other regulating methods may also be used with equal ease and dispatch.

Latch means are attached to the peripheral wall 16 of said support ring 12 such that when the trimmer 10 is closed and the latch means are manually secured, each half of the support ring 12 is positively fastened and secured. FIGS. 1 and 5 illustrate the preferred latch which is a draw pull latch 28 well known in the art. Grip latches, compression spring latches, toggle latches, over center latches and a myriad of other types are anticipated to be alternatively used for this closure.

A channel ring 30 is unitedly joined with a plurality of gussets 32 onto both the inner surface 34 of the horizontal top 14 and the inner surface 36 of the peripheral wall 16 of the support ring 12 as shown in FIGS. 21 and 23. The channel ring 30 is divided into two equal halves each having a bottom and a top with a slot 38 in the top as shown in FIG. 22. The gussets 32 are shown attached to the channel ring 30 near the cut ends and at equal spacing in between securing the channel ring 30 to the support ring 12 in a firm and solid manner. Other methods of attachment may be used such as support rods, pipes, spacers or the like.

Figures 24, 25, 26:
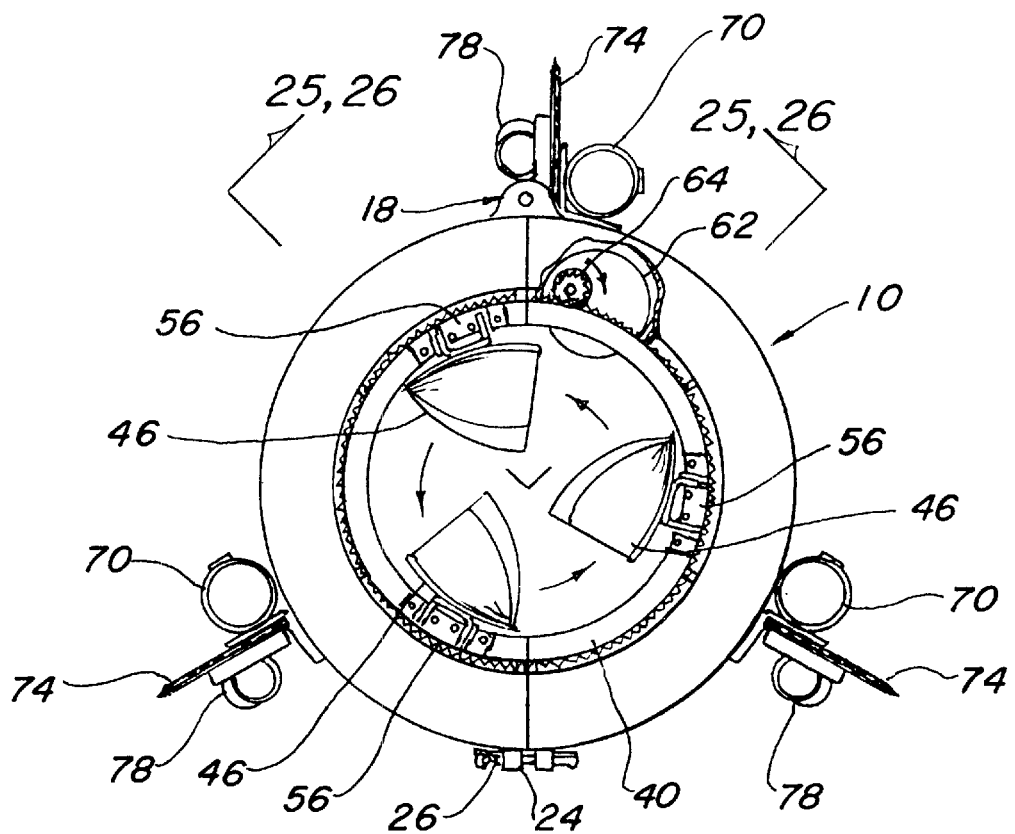
FIG. 24 is a plan view of the preferred embodiment in the closed position, with the blades shown in an extended, inward position during rotation.
FIG. 25 is a cross-sectional view taken along lines 25—25 of FIG. 24 illustrating the blades in an at-rest position.
FIG. 26 is a cross-sectional view taken along lines 26—26 of FIG. 24 illustrating the blades shown in an extended, inward position during rotation.

A rotatable ring gear 40 is juxtaposed on a channel ring 30 in a revolvable manner, as shown in FIGS. 12–20. The ring gear 40 is also split into two equal parts and is rotatably attached to the channel ring 30 with a plurality of horizontal rollers 42 and vertical rollers 44 that are attached directly to the ring gear 40 and protrude into the channel ring 30 through a slot 38, as illustrated in FIGS. 25 and 26. The rollers 42 and 44 provide securement inside the channel ring 30 while permitting the ring gear 40 to revolve freely on top of the channel ring. The vertical rollers 44 are wider than the slot 38 and take the thrust of a load by riding on the bottom, inside surface or the top inside surface according to the external force direction. The centrifugal force produced is contained by the horizontal rollers 42 which engage the inside of the vertical surfaces of the channel ring 30. Rollers of other types and configurations may also be utilized.

A plurality of pivoting knife blades 46 are attached to the ring gear 40 in such a manner as to tilt inward when rapidly rotated, as influenced by centrifugal force. The knife blades 46 are shown in FIGS. 24–29 and are spring-loaded to a vertical position when at rest. One or more torsion springs 48 provide the necessary force to rotate the blades 46 to their original position, as shown in FIGS. 25 and 26. The shape and number of blades may vary from that shown in the drawings, and, while a sharpened edge is illustrated, the edge may be serrated or have saw teeth etc. Additionally, three blades are shown, however any number and or configuration of blades may be used with equal utility.

An adjustable counter balance 50 is provided to equalize the rotational speed of the ring gear 40 in the tilt of the blades 46, and may be of almost any configuration, however the preferred embodiment is illustrated in FIGS. 25–28 and consists of a threaded weight 52 on a threaded rod 54 that is attached below the pivot point of the blade.

A number of blade bracket assemblies 56 are provided to attach each blade 46 to the top of the ring gear 40 in a pivotal manner. The blade bracket assemblies 56 are depicted in FIGS. 29–35 and consist of a ring gear member 58 attached directly to the top of the ring gear 40 contiguous with the inside vertical surface, and a blade member 60 attached to the inside of the blade 46. The torsion springs 48 are mounted on the fasteners, thus attaching the members 58 and 60 together. Again, other configurations of the bracket assemblies 56 may be utilized as long as they rotatably. attach the blade 46 to the ring gear 40 in a similar manner.

A variable speed, ring gear drive motor 62, having a pinion gear 64 is attached to the support ring 12 with a mounting plate 65. The pinion gear 64 interfaces with the ring gear 40, thereby rotating the ring gear 40 on the rollers 42 and 44. The ring gear 40 is rotated at an effective speed, thus tilting the blades 46 sufficiently to engage and cut fronds or branches from a tree upon which the trimmer surrounds. The variable speed ring gear drive motor 62 is shown best in FIG. 12 and preferably utilizes servo control, which permits the motor 62 to stop at a predetermined rotational position for aligning the equal halves of the ring gear 40 and channel ring 30 together. This novel feature allows the trimmer 10 to be hinged open for mounting around a tree 68. It should also be noted that the ring gear 40 and pinion gear 64 both utilize a spur type of gear having a compatible pitch diameter that allows harmonious mating of the pinion gear 64 to the ring gear 40.

A plurality of traction arms 66 are attached to the support ring's vertical peripheral wall 16 for angularly positioning the arms 66 adjacent to a tree 68. The arms 66 also include pivoting means to allow the tree to be positioned. The pivoting means are in the form of first right angle gear motors 70, one for each arm 66. The first gear motors 70 are attached to the support ring's vertical peripheral wall 16, as shown in FIGS. 1, 3, 24 and 36, with an angle bracket 72, or the like, and the drive shaft of each motor 70 is attached to a boss on each arm 66.

Figure 9:
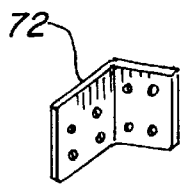
FIG. 9 is a partial isometric view of a traction wheel motor mounting bracket completely removed from the invention for clarity.
Figure 9A:
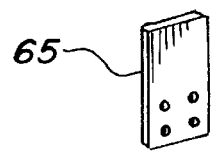
FIG. 9a is a partial isometric view of the drive motor mounting plate completely removed from the invention for clarity.
Figure 10:
FIG. 10 is a partial isometric view of one of the hinge brackets completely removed from the invention for clarity.
Figures 37, 38:
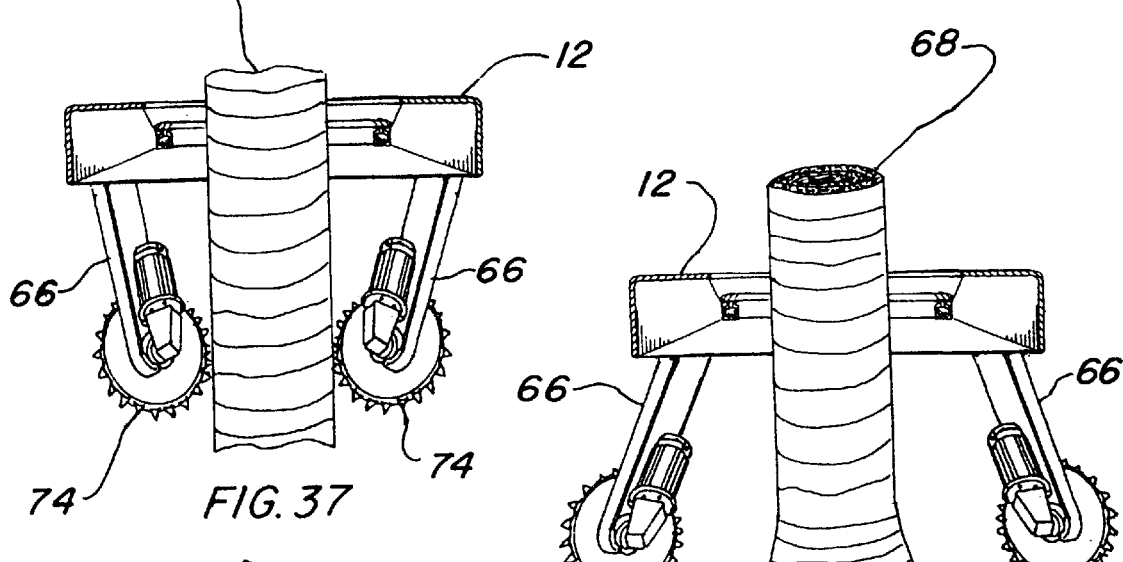
FIG. 37 is a cross-sectional view taken along lines 37—37 of FIG. 36 illustrating the traction arm rotated inward with the toothed traction wheel engaging the tree trunk.
FIG. 38 is a cross-sectional view taken along lines 38—38 of FIG. 36 illustrating the traction arm rotated outward with the toothed traction wheel resting on the ground.
Figure 39:
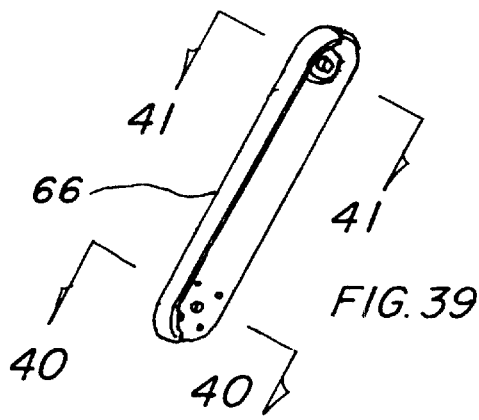
FIG. 39 is a partial isometric view of one of the traction arms, shown separately from the invention for clarity.
Figure 40:
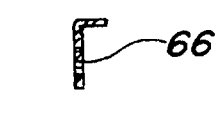
FIG. 40 is a cross-sectional view taken along lines 40—40 of FIG. 39.
Figure 41:
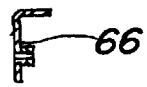
FIG. 41 is a cross-sectional view taken along lines 41—41 of FIG. 39.

The preferred configuration of the bracket 72 is illustrated in FIG. 9, however, other shapes and methods of attachment may also be used. When the gear motors 70 are energized, the arm 66 rotates arcuately either into or away from the tree 68 in accordance with electrical signals originating and controlled by the operator. It should be noted that FIG. 37 shows the arms 66 rotated inward into the tree, and FIG. 38 illustrates the arms 66 angled away from the tree and resting on the ground, however the arms 66 may also be substantantilly angled vertical for storage and may be positioned flat when resting on the ground.

A toothed traction wheel 74 is attached, with wheel rotation means, to the distal end of each traction arm 66 for propelling the trimmer 10 up and down a tree 68 with the wheel teeth 76 incising into the tree bark as the wheel rotates. Other types of teeth such as barbs, abrasive surface or even pneumatic tires with irregular tread are viable alternatives. At any rate the gripping action permits a positive attachment to a tree 68 for the propulsion of the trimmer 10 in both the up or down direction. The wheel rotation means consists of a second right angle gear motor 78 also having a drive shaft attached at an angle to the rotor of the motor. The motor 78 is attached onto the distal end of each traction arm 66, with the traction wheel 74 connected onto the drive shaft, which permits the wheel 74 to rotate in a direction as governed by the motor to propel the trimmer 10 up or down the tree 68. The arrangement of the wheel drive is illustrated in FIGS. 36–41 and as previosuly stated, other motors, arm and wheel arrangement may also be used to operate the invention.

Figure 2:
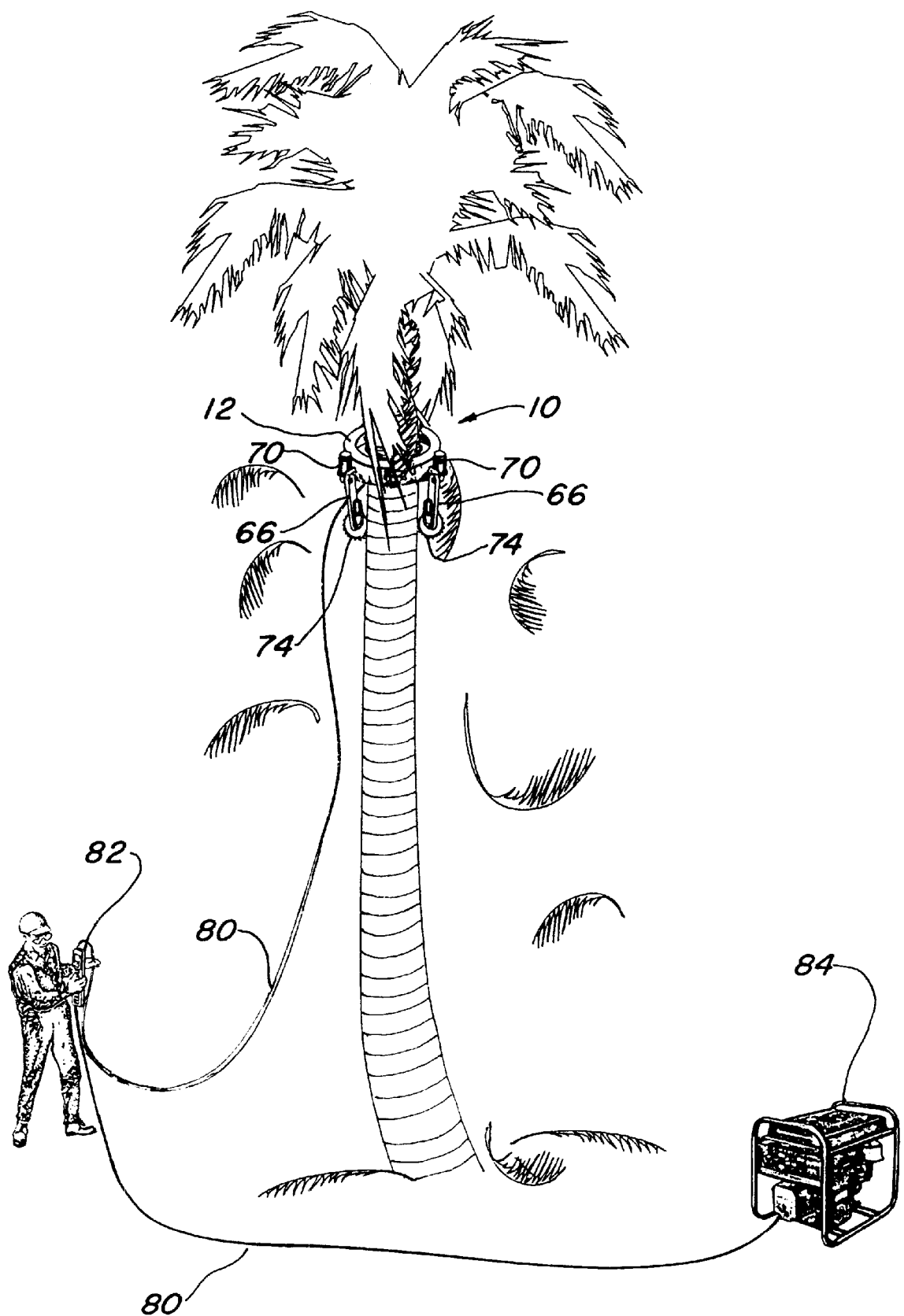
FIG. 2 is a partial isometric view of the preferred embodiment positioned onto a palm tree, and showing the trimmer cutting the fronds as it travels upward driven by the motorized wheels.

A power source is required for supplying electrical power to rotate the blades 46, position the traction arms 66 and rotate the traction wheels 74. The power source can consist of a city utility power source or an engine-driven, portable, auxiliary power generator 84 as shown in FIG. 2. Electrical cables 80 of a conventional type are used to convey the power to an operator control apparatus 82, as also shown in FIG. 2, which may include one or more ac/dc power converters, switch gear, electronic and electromechanical controls, and a similar cable 80 attached to the trimmer 10 to remotely control the motors. It should be noted that it is anticipated that the controls will incorporate the latest technology and as such are small and powerful, which allows the controls to be located within the trimmer itself, in the control apparatus 82 held by the operator, or a combination of both.

In operation, the trimmer 10 is positioned around the base of the tree 68 with the support ring 12 hinged open. The operator closes the two halves of the support ring 12 thus causing the aligning pins 26 to penetrate the sleeves 24. The operator then buckles the latch 28 holding the halves together, steps away from the tree 68 and connects the electrical power, as shown in FIG. 2. The operator then selects the controls to simultaneously rotate the wheels 74 and position the arms 66 to engage the tree trunk. Once the trimmer 10 has climbed the tree to the height where the fronds or branches begin, the drive motor 62 is energized which then rotates the blades 46. Accurate speed control governs the cutting angle of the blades which may be manually controlled to overcome obstacles and to repeat areas by reversing direction to make a smooth and even peripheral cut. When the tree trimming has been completed, the operator reverses the climbing direction, brings the trimmer down, rotates the legs outwardly, disconnects the power and removes the trimmer from the tree 68. It should be noted that the channel ring 30 and the ring gear 40 are synchronized when the rotation is stopped to align with each other permitting the trimmer to open and close around a tree as shown in FIGS. 3 and 4.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. A self-propelled climbing tree trimmer for severing fronds or branches from a growing tree comprising:

a) a hinged, split support ring having a horizontal top portion and a vertical peripheral wall, divided into two equal parts with a hinge connecting the ring parts together, thus permitting the support ring to be axially rotated apart and surround a tree, b) a channel ring having two equal halves defined with a bottom and a top having a slot in the top, unitedly joined onto an inner surface of the horizontal top and an inner surface of the peripheral wall of the support ring, c) a rotatable ring gear that is split into two equal parts and juxtaposed on the channel ring in a revolvable manner, d) a plurality of pivoting knife blades attached to the ring gear in such a manner as to tilt inward when rapidly rotated as influenced by centrifugal force, e) a variable speed, ring gear drive motor, with a pinion gear attached to the hinged, split support ring, that interfaces with the ring gear rotating the ring gear at a effective speed tilting the blades sufficiently to engage and cut fronds or branches from a tree upon which the trimmer surrounds, f) a plurality of traction arms attached to the support ring's vertical peripheral wall, having pivoting means for angularly positioning the arms adjacent to the tree, and g) a toothed traction wheel attached to wheel rotation means at a distal end of each traction arm for propelling the trimmer up and down a tree with the wheel teeth incising into tree bark as the wheel rotates, thereby permitting a positive attachment to the tree for the propulsion of the trimmer, with the channel ring and the ring gear synchronized to align with each other, which permits the trimmer to open and close around a tree.

2. The self-propelled, climbing tree trimmer as recited in claim 1 wherein said support ring horizontal top portion and vertical peripheral wall is formed in one piece.

3. The self-propelled climbing tree trimmer as recited in claim 1 wherein said hinge is disposed on said vertical peripheral wall, thus permitting the support ring to open wide enough to be positioned around a tree trunk.

4. The self-propelled climbing tree trimmer as recited in claim 1 further comprises aligning means attached to the vertical peripheral wall of said support ring such that when the trimmer is closed, each half of the support ring and channel ring are positively aligned and supported.

5. The self-propelled climbing tree trimmer as recited in claim 1 further comprising latch means attached to the peripheral wall of said support ring such that when the trimmer is closed and the latch means are manually secured each half of the support ring and channel ring are positively fastened and secured.

6. The self-propelled climbing tree trimmer as recited in claim 1 further comprising a plurality of gussets unitedly joining the support ring to the horizontal top and peripheral wall of the support ring.

7. The self-propelled climbing tree trimmer as recited in claim 1 wherein said revolvable manner for the ring gear to be juxtaposed on the channel ring further comprises a plurality of horizontal rollers and a plurality of vertical rollers, which are attached to the ring gear protruding into the channel ring through said slot, thus providing securement inside the channel ring while permitting the ring gear to revolve freely on top of the channel ring.

8. The self-propelled climbing tree trimmer as recited in claim 1 wherein said pivoting knife blades are spring-loaded to a vertical position when at rest.

9. The self-propelled climbing tree trimmer as recited in claim 1 wherein each pivoting knife blade further comprises an adjustable counter balance to equalize the rotational speed of the ring gear to the tilt of the blades.

10. The self-propelled climbing tree trimmer as recited in claim 1 wherein said ring gear and said pinion gear each further comprise a spur gear having a compatible pitch diameter that allows harmonious mating of the pinion gear to the ring gear.

11. The self-propelled climbing tree trimmer as recited in claim 1 wherein said variable speed, ring gear drive motor further having servo control, which permits the motor to stop at a predetermined rotational position for aligning the two equal parts of the support ring and channel ring to allow the trimmer to be hinged open for attaching around a tree.

12. The self-propelled climbing tree trimmer as recited in claim 1 wherein said pivoting means for angularly positioning the arms adjacent to the tree further comprise a plurality of right angle gear motors, each having a drive shaft, with each motor attached to the support ring's vertical peripheral wall, and the drive shaft attached to each arm.

13. The self-propelled climbing tree trimmer as recited in claim 1 wherein each wheel rotation means further comprises a right angle gear motor having a drive shaft, with the motor attached onto the distal end of each traction arm, and with the traction wheel connected the drive shaft, thereby permitting the wheel to rotate in a direction as governed by the motor to propel the trimmer up or down a tree.

14. The self-propelled climbing tree trimmer as recited in claim 1 further comprising a power source to supply power to rotate the blades, position the traction arms and rotate the traction wheels, wherein said power source is selected from the group consisting of a utility power source, and an engine driven portable auxiliary power generator.

15. The self-propelled climbing tree trimmer as recited in claim 1 further comprising a control apparatus having at least one ac/dc power converter, switch gear and controls.

16. A self-propelled climbing tree trimmer for severing branches from a tree comprising:
 a) a support ring divided into two equal parts with a hinge connecting the ring parts together, thus permitting the support ring to be axially rotated apart and surround a tree,
 b) a channel ring having two equal halves and a slot in the top, joined onto the support ring,
 c) a rotatable ring gear that is split into two equal parts, and juxtaposed on the channel ring in a revolvable manner,
 d) a plurality of pivoting knife blades attached to the ring gear in such a manner as to tilt inward when rapidly rotated as influenced by centrifugal force,
 e) a ring gear drive motor interfacing with the ring gear which rotates the ring gear at a speed tilting the blades sufficiently to engage and cut fronds or branches from a tree upon which the trimmer surrounds,
 f) a plurality of traction arms attached to the support ring having pivoting means for angularly positioning the arms adjacent to a tree, and
 g) a toothed traction wheel attached at a distal end of said traction arms for propelling the trimmer up and down a tree, with the channel ring and the ring gear synchronized to align with each other, thereby permitting the trimmer to open and close around a tree.

17. A self-propelled climbing tree trimmer for severing branches from a tree comprising:
 a) a split hinged support ring having a split channel ring joined therewith,
 b) a split rotatable ring gear having a plurality of pivoting knife blades juxtaposed on the channel ring in a revolvable manner and configured to pivot inward when rotated,
 c) a ring gear drive motor rotating the ring gear and pivoting the blades inward to engage and cut branches from a tree, and
 d) a plurality of traction arms attached to the support ring for angularly positioning the arms adjacent to a tree, each arm having a motorized traction wheel to propel the trimmer up and down a tree.

* * * * *